(12) United States Patent
Radhakrishnan et al.

(10) Patent No.: US 10,324,867 B2
(45) Date of Patent: Jun. 18, 2019

(54) SYSTEMS AND DEVICES HAVING A SCALABLE BASIC INPUT/OUTPUT SYSTEM (BIOS) FOOTPRINT AND ASSOCIATED METHODS

(71) Applicant: Intel Corporation, Santa Clara, CA (US)

(72) Inventors: Sivakumar Radhakrishnan, Portland, OR (US); Mahesh S. Natu, Sunnyvale, CA (US); Zhenyu Zhu, Folsom, CA (US); Malay Trivedi, Chandler, AZ (US); Randall L. Albion, Portland, OR (US); Chris Ruffin, Chapin, SC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/482,646

(22) Filed: Apr. 7, 2017

(65) Prior Publication Data
US 2018/0293187 A1    Oct. 11, 2018

(51) Int. Cl.
| G06F 13/16 | (2006.01) |
| G06F 13/40 | (2006.01) |
| G06F 13/24 | (2006.01) |
| G06F 3/06 | (2006.01) |

(52) U.S. Cl.
CPC ......... *G06F 13/1668* (2013.01); *G06F 3/061* (2013.01); *G06F 3/0631* (2013.01); *G06F 3/0679* (2013.01); *G06F 13/24* (2013.01); *G06F 13/4068* (2013.01)

(58) Field of Classification Search
None
See application file for complete search history.

(56) References Cited

U.S. PATENT DOCUMENTS

| 5,860,139 | A  | * | 1/1999 | Martin | ............. G06F 12/0623 711/2 |
| 6,697,920 | B2 | * | 2/2004 | Nijhawan | ........... G06F 9/4401 711/153 |
| 7,870,349 | B2 | * | 1/2011 | Lu | .................... G06F 12/0623 711/154 |
| 8,370,612 | B2 | * | 2/2013 | Yu | .................... G06F 11/1417 713/1 |
| 9,471,231 | B2 | * | 10/2016 | Bollandoor | ......... G06F 3/0619 |

\* cited by examiner

*Primary Examiner* — Elias Mamo
(74) *Attorney, Agent, or Firm* — Thorpe North and Western, LLP; Todd B. Alder

(57) ABSTRACT

Devices, systems, and methods for implementing a scalable extended basic input/output system (BIOS) region that increases the BIOS footprint of a system, are provided and described. In addition to a traditional BIOS region located in the memory mapped input/output (MMIO) low region, an extended BIOS region is initialized in a MMIO area of the system address map, where both regions are accessed by MMIO access requests.

20 Claims, 7 Drawing Sheets

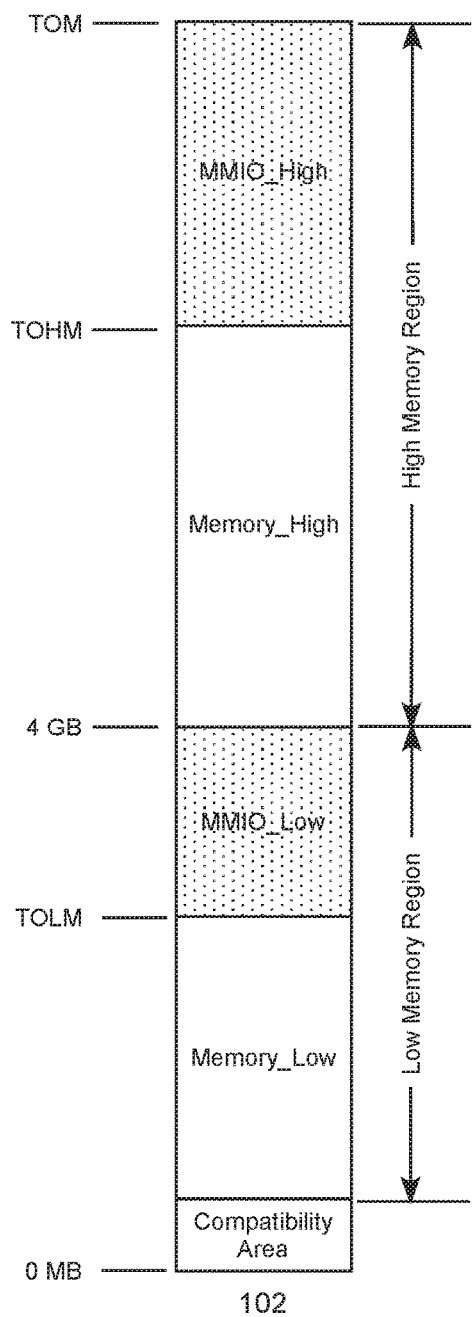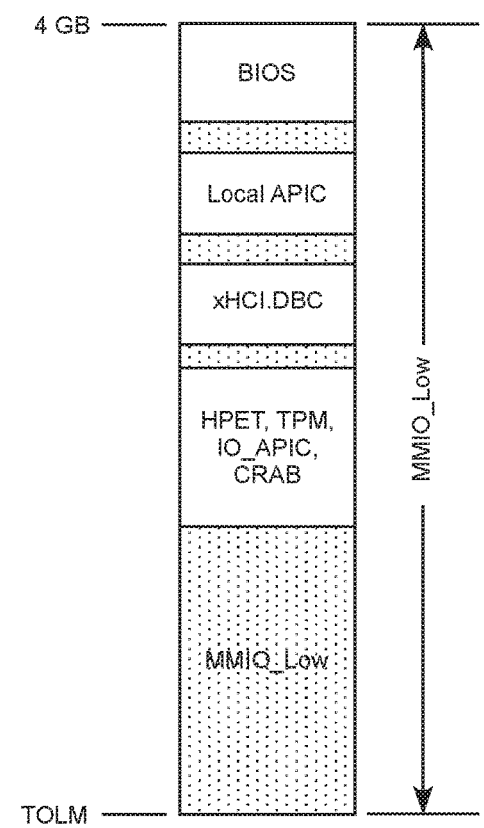
FIG. 1A
FIG. 1B

SYSTEMS AND DEVICES HAVING A SCALABLE BASIC INPUT/OUTPUT SYSTEM (BIOS) FOOTPRINT AND ASSOCIATED METHODS

BACKGROUND

Computing systems generally include a system firmware stored in some form of persistent memory. When power is provided to such a computer system, a process known as "bootstrapping," or more commonly referred to as "booting," is initiated. The influx of power initiates the execution of instructions of the system firmware that cause the system to run various system tests, and to initialize the various hardware components of the system, in order to prepare for the loading and execution of the operating system (OS). In addition to such boot-time processes, Basic Input/Output System (BIOS) also plays a runtime role by providing an abstraction software layer that allows software to directly access various hardware resources.

BRIEF DESCRIPTION OF THE DRAWINGS

FIG. 1A illustrates a traditional system address space of a computing system;

FIG. 1B illustrates a traditional system address space of a computing system;

DESCRIPTION OF EMBODIMENTS

Figure 2:
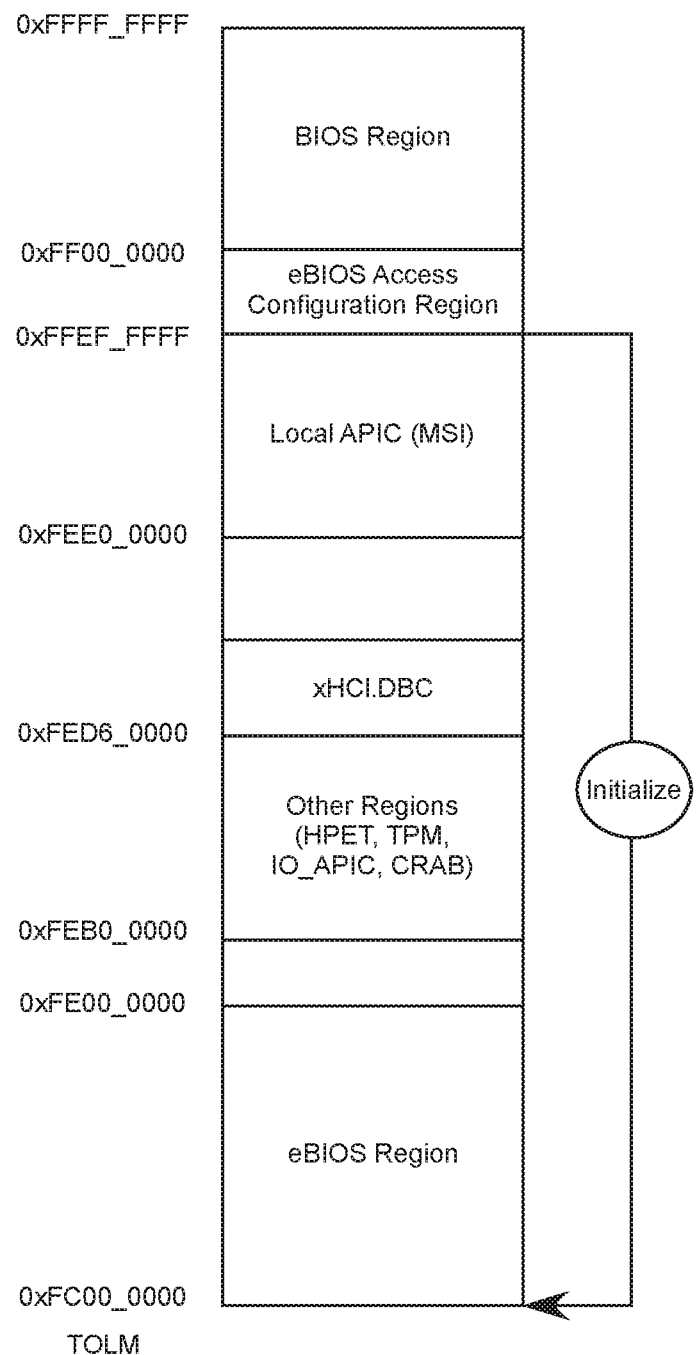
FIG. 2 illustrates a system address space in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

Computing systems generally include a system firmware stored in some form of persistent memory. Upon boot-up of a computing system, power is initiated to the persistent memory containing such firmware, which causes various instructions to be executed. These instructions generally run system tests and initialize the various hardware components of the system in order to prepare for the loading and execution of the operating system (OS). In the initial stage of a system boot, very little of the system is available, other than a central processing unit (CPU), CPU core, or other system processor, and an interface to read the system firmware. From this, other components of the computing system are initialized, such as the main memory of the system, which is initialized in stages. One result of this initialization is the mapping of the main memory of the system to a system address space, which includes a map of addresses for the various resources of the system. The system firmware is mapped to a portion of the system address space that is traditionally 16 megabytes (MB) in size. Once initialized to the point that it can support the intended OS, a "boot loader" program loads and executes the OS.

System firmware can include various types depending on system architecture, chipset, OS, and the like. One example of a system firmware that is commonly used is referred to as Basic Input/Output System (BIOS), which includes many derivations of BIOS. One implementation of BIOS is referred to as Unified Extensible Firmware Interface (UEFI). These examples are considered to be non-limiting, and it should be understood that the following disclosure applies to any type of system firmware. Additionally, as used herein, the term "BIOS" refers generally to all types of system firmware, unless the context clearly indicates otherwise. In addition to the role played in system booting, BIOS also provides an interface between the OS and the hardware of a computing system.

BIOS can generally be accessed by a user during the boot process, prior to the loading of the OS, via a BIOS setup utility. When activated, this setup utility allows a user to alter certain system configurations that are adjustable in the BIOS firmware. Because BIOS is responsible for booting the system, changes made to system configurations will take affect following the next boot (i.e., a reboot). Thus, when the user closes the BIOS setup utility, the system will generally reboot to apply the changes. In addition to changes made by a user through the BIOS setup utility, updates to the BIOS firmware are periodically released by original equipment manufacturers (OEMs). To update BIOS, a firmware update is copied over the current BIOS firmware image located in the persistent BIOS storage, which in some cases is a flash memory storage device, in a process known as "flashing."

An updated BIOS image can be flashed outside of the OS, similar to the BIOS setup utility, or via an application run within the OS that performs the flashing over the BIOS firmware image, followed by a system reboot to execute the updated BIOS.

Computing and server systems have increased in complexity over time, which has generally increased the size of the BIOS footprint, in some cases over the traditional 16 megabyte (MB) limit. In order to maintain backward compatibility with legacy OS and legacy OS applications, certain mapped regions are maintained in specific locations of the system address apace. To achieve common compatibility across computing systems, varying OS environments, software applications, and the like, system, OS, and software developers have generally complied with these legacy configurations. As such, the location and size of the BIOS region in the system address space is constrained, not only by the expected system firmware's mapped location, but also by the current and legacy compatibility requirements of adjacent mapped regions.

In order to better understand these constraints, one example of a traditional system address space map is shown in FIGS. 1A, B. A system address space generally includes address spaces for available resources in the system, including available memory resources from main memory. The map 102 of the system address space can be present in various locations, depending on the system architecture. For example, the system address space map 102 can be located in a chipset, a memory controller, in a processor package (e.g., in an uncore region, system agent, or the like), a memory management unit, or the like, including multiple locations thereof. It is noted that the system address space shown in FIG. 1A and described herein is an example of a typical system address space map, which is not considered to be limiting. System address spaces vary between computing systems and computing system chipsets, and the various details provided herein can readily be translated to different systems by those skilled in the art once in possession of the present disclosure. With that in mind, the system address space maps at least to the main memory and to various memory-mapped input/output (MMIO) devices, and is divided into several regions, including a compatibility region, a low memory region, and a high memory region. In the example shown in FIG. 1A, the compatibility region extends from 0 megabyte (MB) to 1 MB in the system address space, which allows backward compatibility with legacy OS and legacy OS applications, for example, the Intel 8086 processor had a 20-bit address bus limiting the physical memory that could be directly addressed to 1 MB. The low memory region extends from 1 MB to 4 gigabytes (GB), and the high memory region extends from 4 GB to the top of memory (TOM) in the system address space, which varies between systems. In some nonlimiting examples, the TOM can be 16 terabytes (TB) or more.

The low memory region is further divided into an area that maps to main memory (memory low) and extends from the compatibility region to a point referred to as the top of low memory (TOLM), and an area extending from TOLM to 4 GB that is MMIO-mapped (MMIO low). The high memory region is similarly divided into an area that maps to main memory (memory high), which extends from 4 GB to a point referred to as the top of high memory (TOHM), and an area extending from TOHM to TOM that is MMIO-mapped (MMIO high). It is noted that, in both the high and low memory regions, the number and/or order of the memory and MMIO areas can vary. These regions can also each be single continuous regions or multiple discontinuous regions. Additionally, the points identified as TOLM and TOHM can vary, depending on system configuration, the prevalence of input/output (I/O) devices mapped in the system, and the like.

FIG. 1B shows an expanded view of the MMIO low area that extends from TOLM to 4 GB. MMIO low can include a BIOS region located just below 4 GB and is generally 16 MB in size. Other regions of the MMIO low area can include a local Advanced Programmable Interrupt Controller (APIC) region (local APIC) below the BIOS region, followed by an extensible host controller interface (xHCI) region, a high precision event timer (HPET) region, a trusted platform module (TPM) region, an I/O_APIC region, and a control register access bus (CRAB) region, to name a few. One possible approach to increasing the BIOS footprint is to increase the size of the BIOS region by extending the system address space downward to allow the mapping of the BIOS image beyond 16 MB. This approach necessitates moving the existing regions below the BIOS region downward as well, which would be problematic. For example, the local APIC region just below the BIOS region is a standard implementation on many processors and processor cores, as well as a legacy region for message signaled interrupt (MSI). Similar compatibility issues exist for other regions below the BIOS regions, such as the I/O_APIC region and the TPM, for example. In another possible approach to extending the BIOS footprint beyond 16 MB, the portion of the BIOS image beyond 16 MB can be accessed by a host via programmed I/O registers. However, the use of programmed I/O transactions slows down system boot because programmed I/O registers are mapped as uncacheable. I/O transactions are inherently serializing, and thus block the instruction cache until the transaction completions return. In some cases, a system may only be allowed only one I/O transaction per core, and thus would limit system performance.

The present disclosure provides a technological solution for expanding the BIOS region beyond the 16 MB size by mapping a basic BIOS image (i.e., the first 16 MB) to the traditional 16 MB BIOS region and at least one extended BIOS image as an extended BIOS (eBIOS) region in the system address space that is discontiguous with the first 16 MB portion. The eBIOS region can be mapped to MMIO, either MMIO low or MMIO high, without creating performance bottlenecks or conflicts with firmware memory map tables, system address decoders, or the like. Additionally, the eBIOS region is scalable, which is only limited by the amount of MMIO space available to the system and the size of the persistent memory storing the BIOS image.

In one specific example of a system address space, FIG. 2 shows a map from the TOLM to the top of the lower memory region, which is often at 4 GB. This area of the system address space is in MMIO low. As described, the BIOS region generally occupies a 16 MB area at the top of MMIO low region. A portion of this address space, the eBIOS access configuration region, includes instructions to initialize an eBIOS region in the system address space, when needed. As can be seen in FIG. 2, very little expansion of the BIOS region can be made without conflicting with the local APIC region. However, an eBIOS region can be located further down in the MMIO low area, such as, for example, at the bottom of MMIO low. In addition to MMIO low, the eBIOS region can be located in MMIO high, or both MMIO low and MMIO high can include a portion of the eBIOS space. In one specific example, the eBIOS region can be at least 32 MB in size, and can be located anywhere in the MMIO low, MMIO high, or both. In another specific example, an eBIOS region of at least 32 MB in size can be located at the bottom 32 MB of the MMIO low address space. The eBIOS region, however, can be of any size up to the available MMIO address space, and can include one or more eBIOS regions. In another example, the eBIOS is at least 16 MB in size. In yet another example, the eBIOS is a multiple of 8 MB in size. In a further example, the eBIOS region is at least 32 MB in size. In a further example, the eBIOS region is a multiple of 1 MB in size.

Figure 3A:
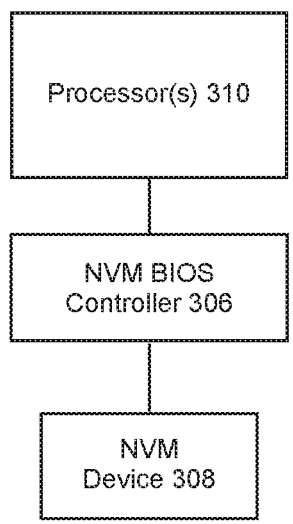
FIG. 3A illustrates a block diagram of selected components of a computing system or device in accordance with an example embodiment.

Various hardware configurations can be utilized to manage BIOS spread across a BIOS region and an eBIOS region, and any such configuration is considered to be within the present scope. In one example, as shown in FIG. 3A, a processor 310 is communicatively coupled to a nonvolatile memory (NVM) device 308 that includes a BIOS image. The processor 310 can include one or more processors, one or more processor cores, or a combination thereof. In one example, the BIOS image can include a contiguous image of a basic BIOS portion and an eBIOS portion, and, in another example, the BIOS image can include a non-contiguous image of a basic BIOS portion and an eBIOS portion. In some cases, multiple copies of the BIOS image can be stored in the NVM device 308. The BIOS image includes various instructions and code, as has been described above. In one example, however, the BIOS image includes instructions that, when executed on a processor, establish a system address space including a memory low region, a MMIO low region above the memory low region, a memory high region above the MMIO low region, a MMIO high region above the memory high region, a BIOS region in the MMIO low region adjacent the memory high region, and a scalable eBIOS region in either the MMIO low or MMIO high region, or both. In one specific example, the eBIOS is in the MMIO low region.

A NVM BIOS controller 306 can be communicatively coupled to the processor 310 and to the NVM device 308, and can manage BIOS transactions to and from the BIOS image on the NVM device 308. The NVM BIOS controller 306 can be any type of controller capable of managing BIOS access transactions. In some examples, the NVM BIOS controller can be a serial peripheral interface (SPI) controller or an enhanced SPI (eSPI) that provides additional capabilities to the SPI protocol, such as messaging, tunneling, higher speeds, and the like.

The NVM device can include any type of NVM capable of storing system firmware, such as the BIOS image. NVM is a persistent storage medium, or in other words, a storage medium that does not require power to maintain the state of data stored therein. Non-limiting examples of NVM can include planar or three-dimensional (3D) NAND flash memory, NOR flash memory, cross point array memory, including 3D cross point memory, phase change memory (PCM), such as chalcogenide PCM, non-volatile dual in-line memory module (NVDIMM), ferroelectric memory (Fe-RAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetoresistive random-access memory (MRAM), write in place non-volatile MRAM (NVMRAM), nanotube RAM (NRAM), and the like, including combinations thereof. In one specific example, the NVM device can include flash memory. In another specific example, the NVM device can include serial flash memory. Serial flash memory is a small, low-power flash memory that uses a serial interface, such as, for example, a SPI bus, for sequential data access. In yet another specific example, the NVM device can include 3D cross point memory.

Figure 3B:
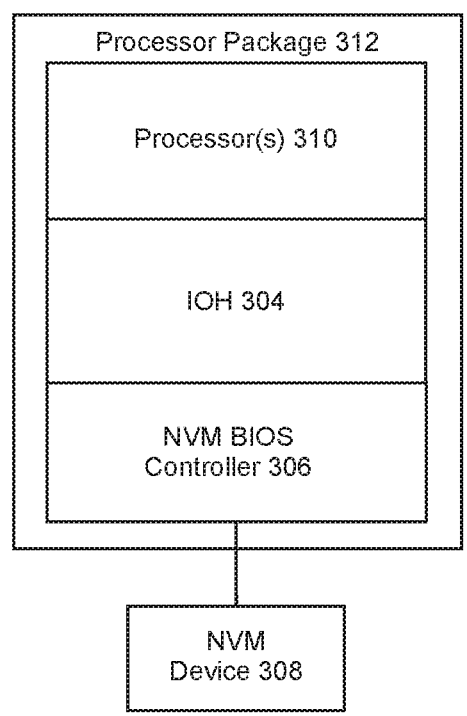
FIG. 3B illustrates a block diagram of selected components of a computing system or device in accordance with an example embodiment.

FIG. 3B shows another example comprising a processor 310, a NVM BIOS controller 306, and an input/output hub (IOH) 304 in a processor package 312. In addition to the configuration shown, the NVM BIOS controller 306 can be located within the IOH 304. In some cases, the NVM BIOS controller 306 can be a NVM BIOS controller or an eSPI controller. The processor 310 can include one or more processors, one or more processor cores, or a combination thereof. Additionally, the processor package 312 can be any type of integrated processor package, such as, for example, a multi-processor package, a multi-core processor package, a system-on-chip package (SoC), a system-in-package (SiP) package, system-on-package (SoP) package, or the like, including combinations thereof. The NVM BIOS controller 306 is communicatively coupled to a NVM device 308, which can be off-package as shown or on-package. In operation, the IOH 304 sends MMIO access requests to the NVM BIOS controller 306 that are directed to addresses within the system address space located in the BIOS region or the eBIOS region. The NVM BIOS controller 306 is configured to, or includes circuitry configured to, perform the MMIO access request on the BIOS image in the NVM device 308.

The implementation of the eBIOS region can be executed according to a variety of techniques. In one example following a system reset, a processor reads basic BIOS instructions from a reset vector in a BIOS image within a NVM device (e.g., at FFFF_FFF0), and then sends an MMIO access request (i.e., a first set of instructions) to a NVM BIOS controller to load a basic BIOS image portion of a BIOS image from the NVM device into the BIOS region of the system address space. In one example, the basic BIOS portion is the first 16 MB of the BIOS image. The processor executes the basic BIOS instructions, which, among other things, executes instructions in a eBIOS access configuration region, which initializes an eBIOS configuration register. These instructions in the eBIOS access configuration region can include the various setup details for the eBIOS region, such as, for example, an eBIOS address or address range, size, and an enable switch (Address location, Size, Enable), such as, for example, 0xFD00000, 32 MB, enable/disable, for example. Upon initialization, these eBIOS setup details are programmed to the eBIOS configuration register. The setup details for the eBIOS region can be configured manually by a system administrator or other user via a BIOS setup utility prior to OS execution, or by the OS or an OS application during OS runtime. The setup details can be stored, such as in the eBIOS access configuration region, to be executed upon a system reboot. In some cases, any or all of the setup details can be fixed values set by, for example, an OEM, which are not intended to be configurable by an end user. In other cases, address and/or size details can be set automatically to one of a number of values or value sets by the system. In yet other cases, an end user can modify any or all of the setup details of the eBIOS region in the BIOS setup utility or through an OS application. While it is generally not beneficial to allow an end user to configure specific system address space ranges for the eBIOS, in some cases an end user can specify a general location for the eBIOS region, such as, for example, in MMIO low vs. MMIO high, in an upper or lower region of MMIO high, in the bottom or an available middle portion of MMIO low, or the like.

Figure 4:
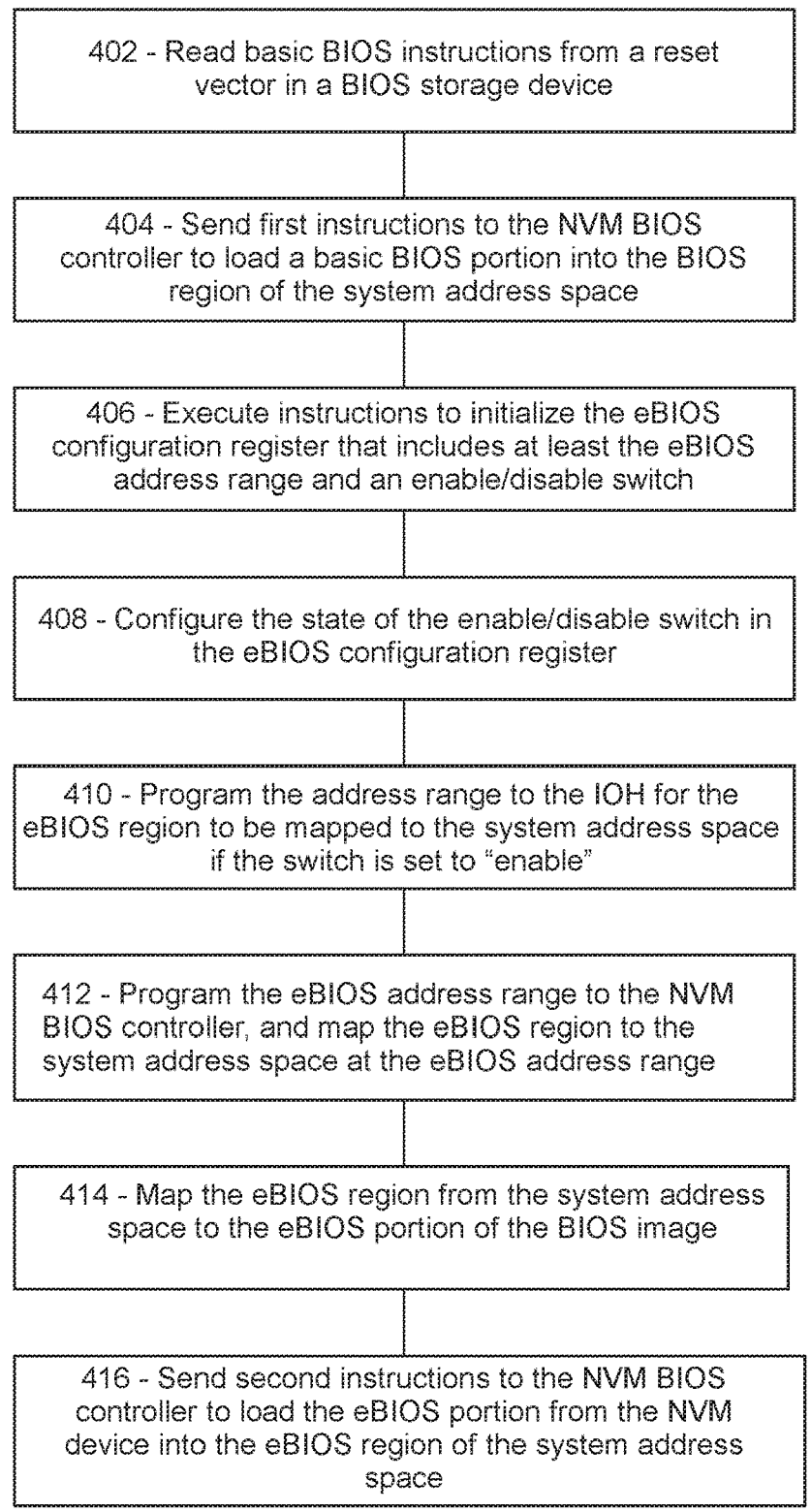
FIG. 4 is a diagram showing portions of a boot sequence to initialize an extended BIOS region in accordance with an example embodiment.

The enable/disable switch of the eBIOS access configuration region can also be set by a system process or by an end user. If the switch is set to "disable," then an eBIOS region will not be initialized in the system address space. If, however, the switch is set to "enable," the eBIOS region will be enabled. FIG. 4, along with FIGS. 3A, B, show an example of portions of a boot sequence to initialize an eBIOS region. As has been described, the processor 310 locates and then 402 reads basic BIOS instructions from a reset vector in the NVM device 308, and 404 sends first instructions to the NVM BIOS controller 306 to load a basic BIOS portion of the BIOS image from the NVM device 308 into the BIOS region of the system address space. Once loaded into the BIOS region, the processor 406 executes instructions from the basic BIOS image (or the BIOS portion of the BIOS image) to initialize the eBIOS configuration register that includes at least the eBIOS address range and an enable/disable switch. As a result, the eBIOS configuration register is initialized, including 408 the state of the enable/disable switch of the eBIOS configuration register according to the setup details of the instructions, which can be based on various system usage modes. If the switch is configured or set to "disable," the processor does not proceed to initialize the eBIOS region. If, however, the enable/disable switch is set to "enable," the processor 410 programs to the IOH 304, the eBIOS address range (or ranges) obtained from the instruction setup details for the eBIOS region to be mapped to the system address space. The processor 412 also programs the eBIOS address range to the NVM BIOS controller 306, and the NVM BIOS controller 306 maps the eBIOS region to the system address space at the eBIOS address range. The NVM BIOS controller then 414 maps the eBIOS region from the system address space to the eBIOS portion of the BIOS image located in the NVM device. Once the NVM BIOS controller has acknowledged that the mapping is complete, the processor 416 sends an MMIO access request (i.e., a second or subsequent set of instructions) to the NVM BIOS controller 306 to load the eBIOS portion of the BIOS image from the NVM device 308 into the eBIOS region of the system address space. This process can be repeated for subsequent portions of the eBIOS image remaining in the NVM device 308. For the various routing, decoding, programming, and mapping operations, the eBIOS configuration register can be exposed the processor 310, the IOH 304, the NVM BIOS controller 306, any internal switch fabric, or any other element of the system that interacts with BIOS. For security reasons, in some examples the system firmware can lock the eBIOS range settings, using for example, an EXT_BIOS_LOCK bit in the NVM BIOS controller's peripheral component interconnect (PCI) configuration space, after configuration of the eBIOS region is complete.

Figure 5:
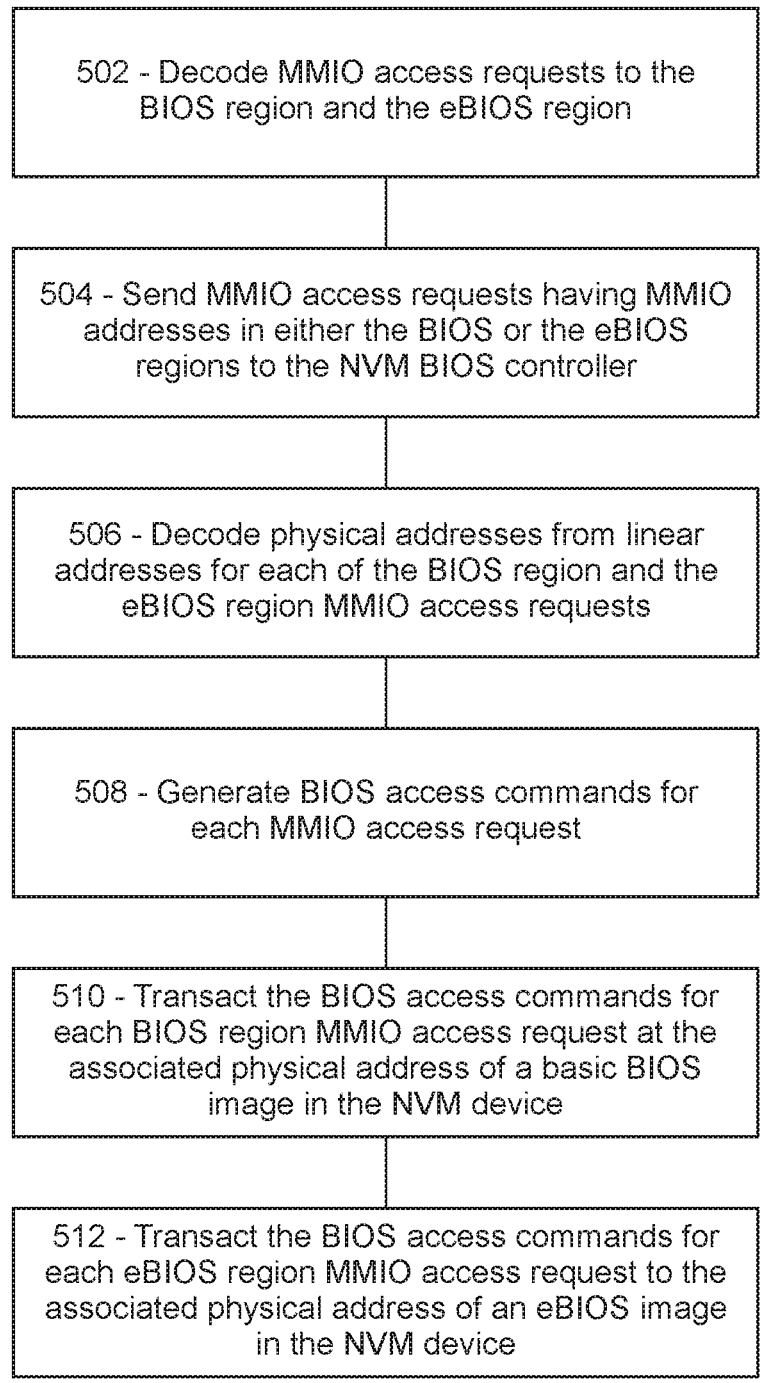
FIG. 5 is a diagram showing portions of a transaction flow for memory-mapped input/output access requests in accordance with an example embodiment.

FIG. 5 shows an example of a transaction flow for MMIO access requests. While the transaction flow is described for MMIO access requests coming from a processor, MMIO access requests from any other host-input can be similarly processed. Additionally, such requests can originate from a BIOS setup utility, an OS application, or the like. As such, the IOH 304 receives MMIO access requests and 502 decodes the MMIO access requests to the BIOS region and the eBIOS region by comparing the associated MMIO access request addresses to the BIOS and eBIOS region address ranges in the MMIO. MMIO access requests having MMIO addresses in either the BIOS region or the eBIOS region are 504 sent to, or otherwise pulled by, the NVM BIOS controller 306, where 506 physical addresses are decoded from the linear addresses for each of the BIOS region and the eBIOS region MMIO access requests. The NVM BIOS controller 306 then 508 generates BIOS access commands for each MMIO access request, 510 transacts the BIOS access commands for each BIOS region MMIO access request at the associated physical addresses in a basic BIOS image in the NVM device 308, and 512 transacts the BIOS access commands for each eBIOS region MMIO access request at the associated physical addresses in an eBIOS image in the NVM device 308. It is noted that, in some examples, access to the basic BIOS and eBIOS images through the BIOS regions is limited to a system running in BIOS descriptor mode.

Figure 6:
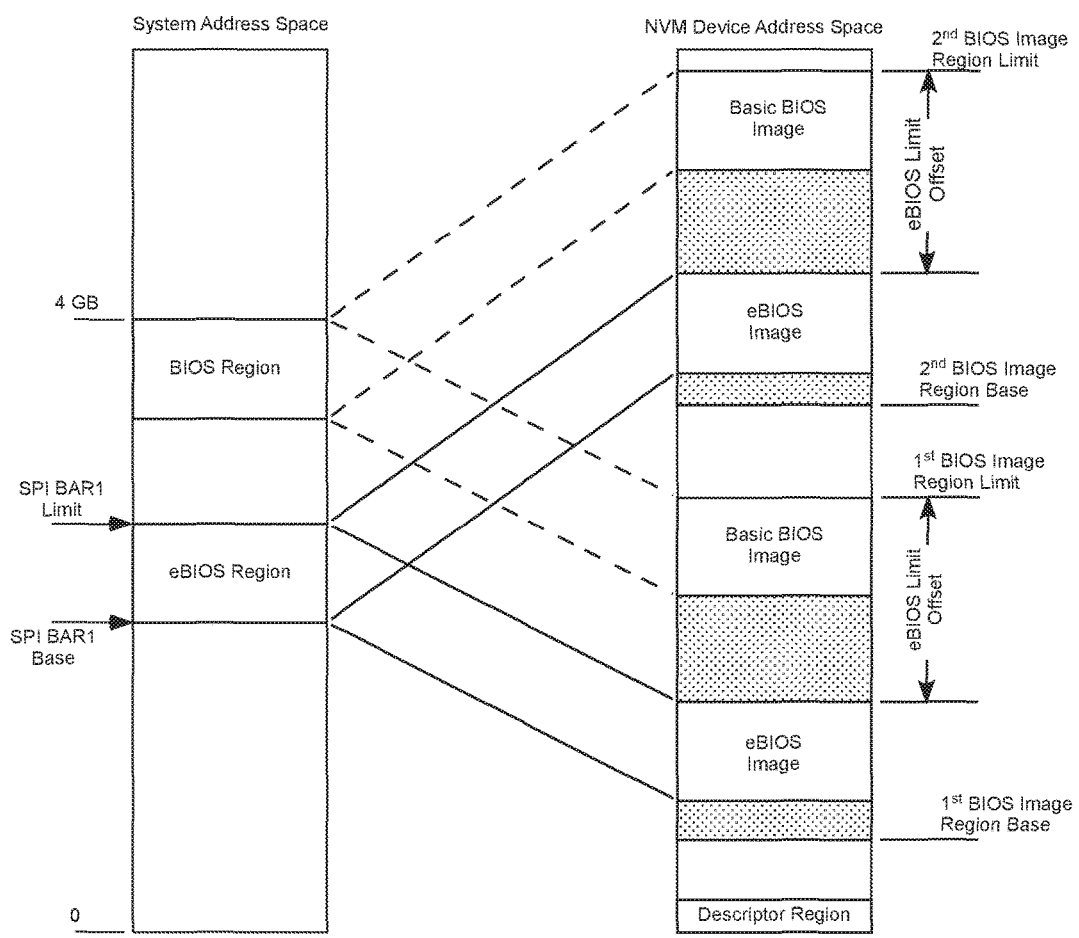
FIG. 6 illustrates a BIOS and extended BIOS mapping between a system address space and an address space of a serial peripheral interface storage device in accordance with an example embodiment.

FIG. 6 shows an example of the BIOS region mapping between the system address space and the address space of the NVM device. The system address space shows a BIOS region just below 4 GB and an eBIOS region below the BIOS region in the MMIO low. These BIOS regions can be defined by programmable base address registers (BARs). As one non-limiting example using SPI protocol, the size of the eBIOS region can be allocated to a SPI BAR, such as 32 MB to SPI BAR1. SPI BAR1 Limit can establish the upper boundary of the eBIOS region, and the SPI BAR1 Base can establish the lower boundary of the eBIOS region. The BIOS is limited to within the boundaries established by the BARs for both the BIOS and eBIOS regions. Additionally, the NVM BIOS controller will only access the NVM device through the BIOS region or the eBIOS region, which are bounded by the SPI BAR Limit and Base registers. As described above, during initialization of the eBIOS region, the NVM BIOS controller decodes the address ranges from the eBIOS configuration register, which maps to the address space of the NVM device. FIG. 6 shows an example whereby the NVM device includes a first BIOS image region and a second BIOS image region, that in some cases can include redundant copies of one another. Each BIOS region includes a basic BIOS image to which the BIOS region is mapped and an eBIOS image to which the eBIOS region is mapped. The basic BIOS image and the eBIOS image can be referred to collectively as "the BIOS image." The first BIOS image region is bounded by a first BIOS image region limit at the top and by a first BIOS image region base at the bottom. In this example, the basic BIOS region is located at the top of the first BIOS image region, and the eBIOS region is located starting at an eBIOS limit offset from the first BIOS image region limit boundary. Similarly, the second BIOS image region is bounded by a second BIOS image region limit at the top and by a second BIOS image region base at the bottom. In this example, the basic BIOS region is located at the top of the second BIOS image region, and the eBIOS region is located starting at an eBIOS limit offset from the second BIOS image region limit boundary. As the two BIOS image regions are implemented to provide a redundant copy, the NVM BIOS controller can modify both BIOS image regions in response to MMIO access request to write to the BIOS image. Additionally, in some cases the system can support a configuration of 1 MB multiples for the base/limit of the BIOS image regions, which can be useful when, for example, the size of the eBIOS image is less than the size of the eBIOS region. In such cases, the eBIOS region in the system address space can be adjusted in multiples of 1 MB to more accurately match the size of the eBIOS image. As the eBIOS image is mapped to MMIO space, reducing the size of the eBIOS image frees up MMIO space in the system address map that would not be used otherwise. As one example, if the eBIOS region is specified to be 32 MB in size, but the eBIOS image is only 19 MB in size, 13 MB of the eBIOS region will be unused. By adjusting the MMIO eBIOS region in 1 MB increments, either from the base or the limit, this extra unused space is reclaimed. The 19 MB eBIOS image is mapped to the resulting 19 MB eBIOS region in the system address space. Additionally, the 1 MB size increment is merely exemplary, and any granularity increment that is smaller or larger than 1 MB is considered to be within the present scope.

Figure 7:
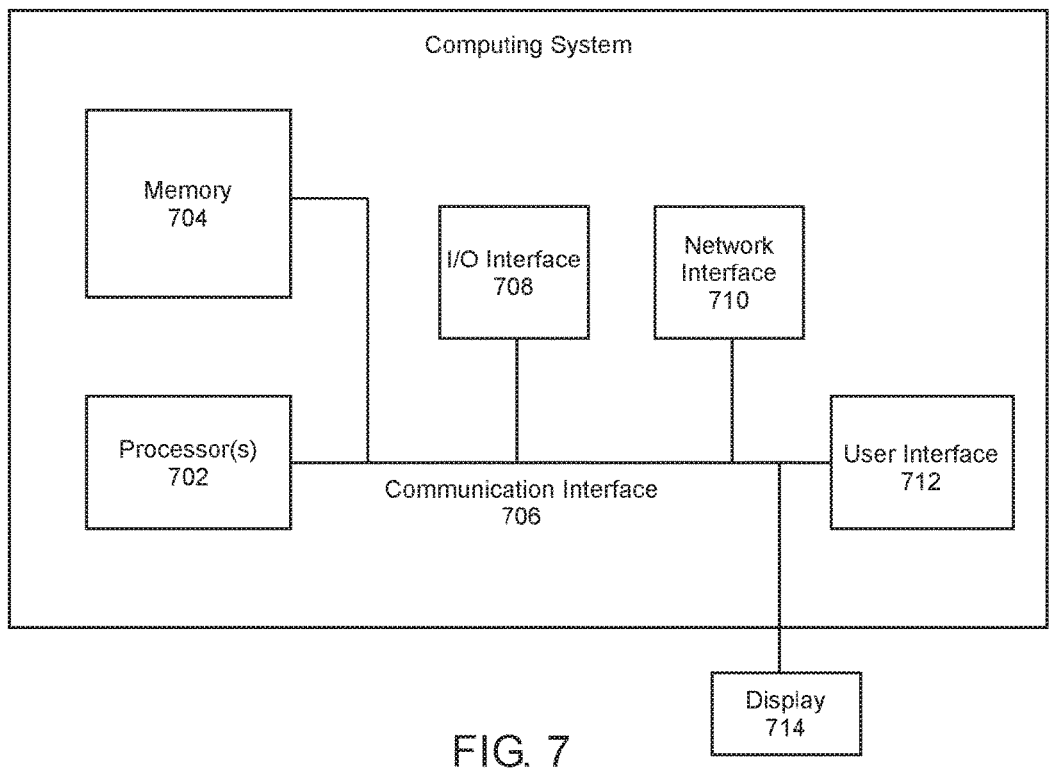
FIG. 7 is a block diagram of a computing system in accordance with an example embodiment.

FIG. 7 illustrates an example of a general computing system or device 700 that can be employed in the present technology, in some examples as a host system. While any type or configuration of device or computing system is contemplated to be within the present scope, non-limiting examples can include node computing systems, system-on-a-chip (SoC) systems, server systems, networking systems, high capacity computing systems, laptop computers, tablet computers, desktop computers, smart phones, or the like.

The computing system 700 can include one or more processors 702 in communication with a memory 704. The memory 704 can include any device, combination of devices, circuitry, or the like, that is capable of storing, accessing, organizing, and/or retrieving data. Additionally, a communication interface 706, such as a local communication interface, for example, provides connectivity between the various components of the system. For example, the communication interface 706 can be a local data bus and/or any related address or control busses as may be useful.

The computing system 700 can also include an I/O interface 708 for controlling the I/O functions of the system, as well as for I/O connectivity to devices outside of the computing system 700. A network interface 710 can also be included for network connectivity. The network interface 710 can control network communications both within the system and outside of the system, and can include a wired interface, a wireless interface, a Bluetooth interface, optical interface, communication fabric, and the like, including appropriate combinations thereof. Furthermore, the computing system 700 can additionally include a user interface 712, a display device 714, as well as various other components that would be beneficial for such a system.

The processor 702 can be a single or multiple processors, including single or multiple processor cores, and the memory can be a single or multiple memories. The local communication interface can be used as a pathway to facilitate communication between any of a single processor or processor cores, multiple processors or processor cores, a single memory, multiple memories, the various interfaces, and the like, in any useful combination.

The memory 704 can include a memory with volatile memory, NVM, or a combination thereof. Volatile memory, for example, is a storage medium that requires power to maintain the state of data stored by the medium. Nonlimiting examples of volatile memory can include random access memory (RAM), such as static random access memory (SRAM), dynamic random-access memory (DRAM), synchronous dynamic random access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

Nonvolatile memory (NVM) is a persistent storage medium, or in other words, a storage medium that does not require power to maintain the state of data stored therein. Nonlimiting examples of NVM can include planar or three-dimensional (3D) NAND flash memory, NOR flash memory, cross point array memory, including 3D cross point memory, phase change memory (PCM), such as chalcogenide PCM, non-volatile dual in-line memory module (NVDIMM), ferroelectric memory (FeRAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetoresistive random-access memory (MRAM), write in place non-volatile MRAM (NVMRAM), nanotube RAM (NRAM), and the like, including combinations thereof. These types of NVM may be byte or block addressable. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the system memory can be 3D cross point memory. In another specific example, the system memory can be flash memory.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

Examples

The following examples pertain to specific embodiments and point out specific features, elements, or steps that can be used or otherwise combined in achieving such embodiments.

In one example, there is provided an electronic device comprising a processor, and a non-volatile memory (NVM) device communicatively coupled to the processor, the NVM device including a basic input/output system (BIOS) image and instructions that, when executed on the processor, establish a system address space comprising a system memory low region, a memory-mapped I/O (MMIO) low region above the system memory low region, a system memory high region above the MMIO low region, a MMIO high region above the system memory high region, a BIOS region in the MMIO low region adjacent the system memory high region, and a scalable extended BIOS (eBIOS) region in either the MMIO low or the MMIO high region.

In one example of a device, the eBIOS region is in the MMIO low region.

In one example of a device, the system address space further comprises an Input/Output (I/O) advanced programmable interrupt controller (APIC) region in the MMIO low region below the BIOS region, and wherein the eBIOS region is below the I/O APIC region.

In one example of a device, the eBIOS region is at least 16 MB in size.

In one example of a device, the eBIOS region is a multiple of 8 MB in size.

In one example of a device, the eBIOS region is at least 32 MB in size.

In one example of a device, the processor can include one or more processors, one or more processor cores, or a combination thereof.

In one example of a device, the processor is in a processor package, a multi-core processor package, a system-on-chip package (SoC), a system-in-package (SiP) package, system-on-package (SoP) package, or a combination thereof.

In one example of a device, the NVM device is flash memory.

In one example of a device, the NVM device is three dimensional (3D) cross point memory.

One example of a device can further comprise a main memory mapped to the system address space.

In one example, there is provided a computing system, comprising a processor,
an input/output hub (IOH) communicatively coupled to the processor, and
a non-volatile memory (NVM) device communicatively coupled to the IOH, the NVM device including a basic input/output system (BIOS) image and instructions that, when executed on the processor, establish a system address space. The system address space comprises a system memory low region, a memory-mapped I/O (MMIO) low region above the system memory low region, a system memory high region above the MMIO low region, a MMIO high region above the system memory high region, a BIOS region in the MMIO low region adjacent the system memory high region, and a scalable extended BIOS (eBIOS) region in either the MMIO low or the MMIO high region.

In one example of a system, the eBIOS region is in the MMIO low region.

In one example of a system, the system address space further comprises an Input/Output (I/O) advanced programmable interrupt controller (APIC) region in the MMIO low region below the BIOS region, and wherein the e BIOS region is below the I/O APIC region.

In one example of a system, the extended BIOS region is at least 32 MB in size.

In one example of a system, the processor can include one or more processors, one or more processor cores, or a combination thereof.

In one example of a system, the processor is in a processor package, a multi-core processor package, a system-on-chip package (SoC), a system-in-package (SiP) package, system-on-package (SoP) package, or a combination thereof.

In one example of a system, the NVM device is flash memory.

In one example of a system, the NVM device is three dimensional (3D) cross point memory.

One example of a system can further comprise a main memory mapped to the system address space.

One example of a system further comprises a NVM BIOS controller communicatively coupled to the IOH and to the NVM device, wherein the IOH further comprises circuitry configured to identify MMIO access requests to either the BIOS region or the eBIOS region from the processor, and send the BIOS region and the eBIOS region MMIO access requests to the NVM BIOS controller.

In one example of a system, the NVM BIOS controller further comprises circuitry configured to determine physical addresses from linear addresses for each of the BIOS region and the eBIOS region MMIO access requests, generate BIOS access commands for each MMIO access request, send the BIOS access commands for each BIOS region MMIO access request to a BIOS image region of the NVM device at the associated physical address, and send the BIOS access commands for each eBIOS region MMIO access request to an eBIOS image region of the NVM device at the associated physical address.

In one example of a system, the NVM BIOS controller further comprises circuitry further configured to determine the physical addresses from linear addresses for each of the BIOS region and the eBIOS region MMIO access requests, the circuitry is further configured to determine a first physical address and a second physical address from each linear address, to send the BIOS access commands for each BIOS region MMIO access request to the BIOS image region, the circuitry is further configured to send each BIOS access command to a first BIOS image region at the associated first physical address and to a second BIOS image region at the associated second physical address, and to send the BIOS access commands for each eBIOS region MMIO access request to the eBIOS image region, the circuitry is further configured to send each BIOS access command to a first eBIOS image region at the associated first physical address and to a second eBIOS image region at the associated second physical address.

In one example of a system, the NVM BIOS controller is a serial peripheral interface (SPI) controller.

In one example, there is provided a method for scalably extending a basic input/output system (BIOS) region size in a system address space, comprising establishing, by executing BIOS instructions on a processor, a system address space comprising a system memory low region, a memory-mapped Input/Output (MMIO) low region above the system memory low region, a system memory high region above the MMIO low region, a MMIO high region above the system memory high region, a BIOS region in the MMIO low region adjacent the system memory high region, and a scalable extended BIOS (eBIOS) region in either the MMIO low or the MMIO high region.

In one example of a method, the eBIOS region is in the MMIO low region.

In one example of a method, the system address space further comprises an Input/Output (I/O) advanced programmable interrupt controller (APIC) region in the MMIO low region below the BIOS region, and wherein the eBIOS region is below the I/O APIC region.

In one example of a method, upon a system reboot, establishing the eBIOS region of the system address space further comprises reading, by the processor, basic BIOS instructions from a reset vector in the BIOS image, wherein the BIOS image is stored in a non-volatile memory (NVM) device, sending first instructions from the processor to a NVM BIOS controller to load a basic BIOS portion of the BIOS image from the NVM device into the BIOS region of the system address space, and executing, by the processor, instructions from the basic BIOS image to initialize an eBIOS configuration register that includes an eBIOS address range and an enable/disable switch. The method further comprises programming, by the processor to an input/output hub (IOH) and the NVM BIOS controller, the eBIOS address range, and mapping, by the NVM BIOS controller, the eBIOS region to the system address space at the eBIOS address range.

One example of a method further comprises mapping, by the NVM BIOS controller, the eBIOS region from the system address space to an eBIOS portion of the BIOS image on the NVM device, and sending second instructions from the processor to the NVM BIOS controller to load the eBIOS portion of the BIOS image from the NVM device into the eBIOS region of the system address space.

In one example of a method, mapping the eBIOS region from the system address space to the eBIOS portion of the BIOS image further comprises mapping the eBIOS region to a first eBIOS portion of a first BIOS image and mapping the eBIOS region to a second eBIOS portion of a second BIOS image.

One example of a method further comprises configuring, by the processor, a state of the enable/disable switch, and programming, by the processor to the IOH and to the NVM BIOS controller, the eBIOS address range if the state is set to "enable."

One example of a method further comprises identifying, by the IOH, MMIO access requests from the processor to the BIOS region or the eBIOS region of the system address space sending the BIOS region and the eBIOS region MMIO access requests to the NVM BIOS controller, determining, by the NVM BIOS controller, a physical address from a linear address for each of the BIOS region and eBIOS region MMIO access requests, generating, by the NVM BIOS controller, BIOS access commands for each BIOS region and eBIOS region MMIO access request, sending, from the NVM BIOS controller, the BIOS access commands for each BIOS region MMIO access request to the basic BIOS portion of the BIOS image of the NVM device at the associated physical address, and sending the BIOS access commands for each eBIOS region MMIO access request to the eBIOS portion of the BIOS image region of the NVM device at the associated physical address.

In one example, there is provided an electronic device comprising a chipset configured to communicatively couple to a processor, the chipset including an input/output hub (IOH) and a system peripheral interface (SPI) controller in the IOH. The device further comprises a non-volatile memory (NVM) device communicatively coupled to the SPI controller, the NVM device comprising a basic input/output system (BIOS) image and instructions that, when executed on the processor, establish a system address space comprising a system memory low region, a memory-mapped I/O (MMIO) low region above the system memory low region, a system memory high region above the MMIO low region, a MMIO high region above the system memory high region, a BIOS region in the MMIO low region adjacent the system memory high region, and a scalable extended BIOS (eBIOS) region in either the MMIO low or the MMIO high region.

In one example of a device, the eBIOS region is in the MMIO low region.

In one example of a device, the system address space further comprises an Input/Output (I/O) advanced programmable interrupt controller (APIC) region in the MMIO low region below the BIOS region, and wherein the eBIOS region is below the I/O APIC region.

In one example of a device, the eBIOS region is at least 16 MB in size.

In one example of a device, the eBIOS region is a multiple of 8 MB in size.

In one example of a device, the eBIOS region is at least 32 MB in size.

In one example of a device, the device further comprises the processor communicatively coupled to the chipset.

In one example of a device, the processor can include one or more processors, one or more processor cores, or a combination thereof.

One example of a device further comprising a main memory mapped to the system address space.

In one example of a device, the processor is in a processor package, a multi-core processor package, a system-on-chip package (SoC), a system-in-package (SiP) package, system-on-package (SoP) package, or a combination thereof.

In one example of a device, wherein the NVM device is flash memory.

In one example of a device, the NVM device is three dimensional (3D) cross point memory.

The invention claimed is:

1. An electronic device, comprising:
a processor; and
a non-volatile memory (NVM) device communicatively coupled to the processor, the NVM device including a basic input/output system (BIOS) image and instructions that, when executed on the processor, establish a system address space comprising:
a system memory low region;
a memory-mapped input/output (MMIO) low region above the system memory low region;
a system memory high region above the MMIO low region;
a MMIO high region above the system memory high region;
a BIOS region in the MMIO low region adjacent the system memory high region;
an input/output (I/O) advanced programmable interrupt controller (APIC) region in the MMIO low region below the BIOS region; and
a scalable extended BIOS (eBIOS) region in either the MMIO low region below the I/O APIC region or the MMIO high region.

2. The device of claim 1, wherein the eBIOS region is at least 32 MB in size.

3. The device of claim 2, wherein the processor is in a processor package, a multi-core processor package, a system-on-chip package (SoC), a system-in-package (SiP) package, system-on-package (SoP) package, or a combination thereof.

4. The device of claim 1, wherein the NVM device is flash memory.

5. The device of claim 1, wherein the NVM device is three dimensional (3D) cross point memory.

6. A computing system, comprising:
a processor;
an input/output hub (IOH) communicatively coupled to the processor; and a non-volatile memory (NVM) device communicatively coupled to the IOH, the NVM device including a basic input/output system (BIOS) image and instructions that, when executed on the processor, establish a system address space comprising:
  a system memory low region;
  a memory-mapped input/output (MMIO) low region above the system memory low region;
  a system memory high region above the MMIO low region;
  a MMIO high region above the system memory high region;
  a BIOS region in the MMIO low region adjacent the system memory high region;
  an input/output (I/O) advanced programmable interrupt controller (APIC) region in the MMIO low region below the BIOS region; and
  a scalable extended BIOS (eBIOS) region in either the MMIO low region below the I/O APIC region or the MMIO high region.

7. The system of claim 6, wherein the extended BIOS region is at least 32 MB in size.

8. The system of claim 6, wherein the processor can include one or more processors, one or more processor cores, or a combination thereof.

9. The system of claim 8, wherein the processor is in a processor package, a multi-core processor package, a system-on-chip package (SoC), a system-in-package (SiP) package, system-on-package (SoP) package, or a combination thereof.

10. The system of claim 6, wherein the NVM device is flash memory.

11. The system of claim 6, wherein the NVM device is three dimensional (3D) cross point memory.

12. The system of claim 6, further comprising:
  a NVM BIOS controller communicatively coupled to the IOH and to the NVM device; and
  wherein the IOH further comprises circuitry configured to:
    identify MMIO access requests to either the BIOS region or the eBIOS region from the processor; and
    send the BIOS region and the eBIOS region MMIO access requests to the NVM BIOS controller.

13. The system of claim 12, wherein the NVM BIOS controller further comprises circuitry configured to:
  determine physical addresses from linear addresses for each of the BIOS region and the eBIOS region MMIO access requests;
  generate BIOS access commands for each MMIO access request;
  send the BIOS access commands for each BIOS region MMIO access request to a BIOS image region of the NVM device at the associated physical address; and
  send the BIOS access commands for each eBIOS region MMIO access request to an eBIOS image region of the NVM device at the associated physical address.

14. The system of claim 13, wherein the NVM BIOS controller further comprises circuitry further configured to:
  determine the physical addresses from linear addresses for each of the BIOS region and the eBIOS region MMIO access requests, the circuitry is further configured to determine a first physical address and a second physical address from each linear address;
  send the BIOS access commands for each BIOS region MMIO access request to the BIOS image region, the circuitry is further configured to send each BIOS access command to a first BIOS image region at the associated first physical address and to a second BIOS image region at the associated second physical address; and
  send the BIOS access commands for each eBIOS region MMIO access request to the eBIOS image region, the circuitry is further configured to send each BIOS access command to a first eBIOS image region at the associated first physical address and to a second eBIOS image region at the associated second physical address.

15. The system of claim 12, wherein the NVM BIOS controller is a serial peripheral interface (SPI) controller.

16. A method for scalably extending a basic input/output system (BIOS) region size in a system address space, comprising:
  establishing, by executing BIOS instructions on a processor, a system address space comprising:
    a system memory low region;
    a memory-mapped input/output (MMIO) low region above the system memory low region;
    a system memory high region above the MMIO low region;
    a MMIO high region above the system memory high region;
    a BIOS region in the MMIO low region adjacent the system memory high region;
    an input/output (I/O) advanced programmable interrupt controller (APIC) region in the MMIO low region below the BIOS region; and
    a scalable extended BIOS (eBIOS) region in either the MMIO low region below the I/O APIC region or the MMIO high region.

17. The method of claim 16, wherein, upon a system reboot, establishing the eBIOS region of the system address space further comprises:
  reading, by the processor, basic BIOS instructions from a reset vector in a BIOS image, wherein the BIOS image is stored in a non-volatile memory (NVM) device;
  sending first instructions from the processor to a NVM BIOS controller to load a basic BIOS portion of the BIOS image from the NVM device into the BIOS region of the system address space;
  executing, by the processor, instructions from the BIOS image to initialize an eBIOS configuration register that includes an eBIOS address range and an enable/disable switch;
  programming, by the processor to an I/O hub (IOH) and the NVM BIOS controller, the eBIOS address range;
  mapping, by the NVM BIOS controller, the eBIOS region to the system address space at the eBIOS address range;
  mapping, by the NVM BIOS controller, the eBIOS region from the system address space to an eBIOS portion of the BIOS image on the NVM device; and
  sending second instructions from the processor to the NVM BIOS controller to load the eBIOS portion of the BIOS image from the NVM device into the eBIOS region of the system address space.

18. The method of claim 17, wherein mapping the eBIOS region from the system address space to the eBIOS portion of the BIOS image further comprises mapping the eBIOS region to a first eBIOS portion of a first BIOS image and mapping the eBIOS region to a second eBIOS portion of a second BIOS image.

19. The method of claim 17, further comprising:
  configuring, by the processor, a state of the enable/disable switch; and
  programming, by the processor to the IOH and to the NVM BIOS controller, the eBIOS address range if the state is set to "enable".

20. The method of claim 17, further comprising:
identifying, by the IOH, MMIO access requests from the processor to the BIOS region or the eBIOS region of the system address space;
sending the BIOS region and the eBIOS region MMIO access requests to the NVM BIOS controller;
determining, by the NVM BIOS controller, a physical address from a linear address for each of the BIOS region and eBIOS region MMIO access requests;
generating, by the NVM BIOS controller, BIOS access commands for each BIOS region and eBIOS region MMIO access request;
sending, from the NVM BIOS controller, the BIOS access commands for each BIOS region MMIO access request to the basic BIOS portion of the BIOS image of the NVM device at the associated physical address; and
sending the BIOS access commands for each eBIOS region MMIO access request to the eBIOS portion of the BIOS region of the NVM device at the associated physical address.

* * * * *